July 15, 1969  B. U. GUSTAFSSON  3,455,145
VISCOSITY OR CONSISTENCY METER
Filed May 16, 1968  3 Sheets-Sheet 1

BERTH ULRIK GUSTAFSSON,
INVENTOR

July 15, 1969    B. U. GUSTAFSSON    3,455,145
VISCOSITY OR CONSISTENCY METER
Filed May 16, 1968    3 Sheets-Sheet 2

BERTH ULRIK GUSTAFSSON
INVENTOR

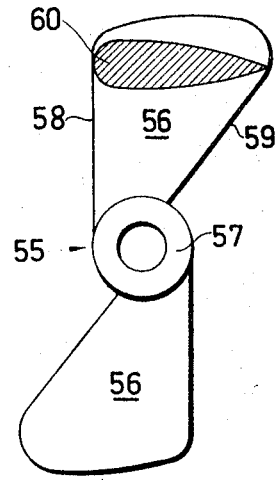
Fig. 7
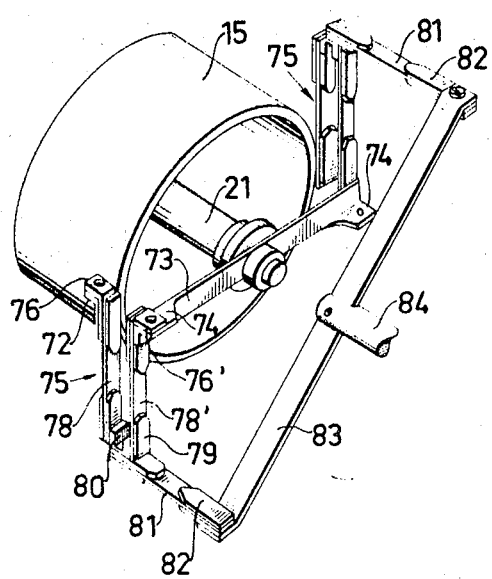
Fig. 3
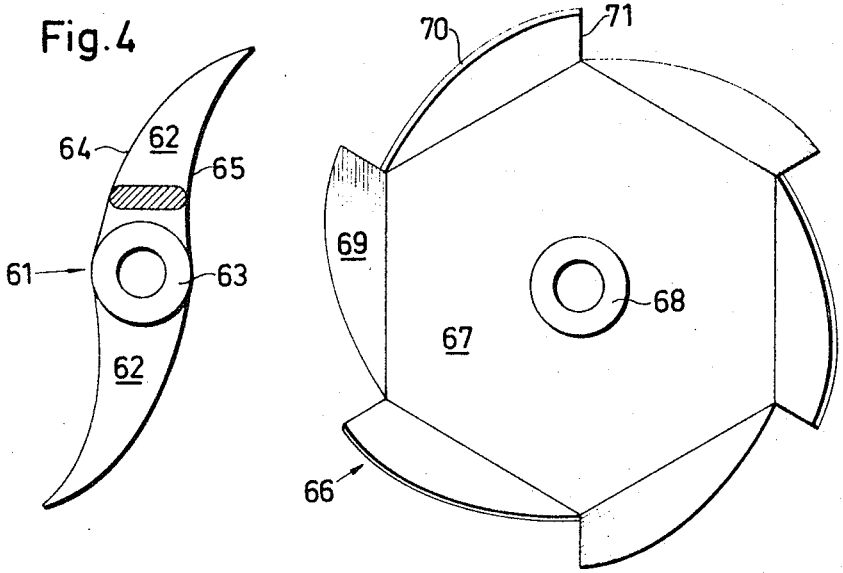
Fig. 4
Fig. 5

United States Patent Office 3,455,145
Patented July 15, 1969

1

3,455,145
VISCOSITY OR CONSISTENCY METER
Berth Ulrik Gustafsson, Säffle, Sweden, assignor to Aktiebolaget Kalle-Regulatorer, Säffle, Sweden
Continuation-in-part of application Ser. No. 561,972, June 30, 1966. This application May 16, 1968, Ser. No. 729,663
Claims priority, application Sweden, Nov. 3, 1965, 14,169/65
Int. Cl. G01n 11/00
U.S. Cl. 73—59                                6 Claims

ABSTRACT OF THE DISCLOSURE

A consistency meter for fibre suspensions is provided with a sensing rotary member secured to one end of a spindle which is resiliently connected to a surrounding tubular driving shaft carrying a propeller. The rotating members are inserted in a lateral extension of a conduit for fluid out of contact with the main flow, and means are provided to indicate the angular movement of the spindle in relation to the driving shaft.

---

This application is a continuation-in-part of my application Ser. No. 561,972 filed June 30, 1966, entitled, Improvements in a Viscosity or Consistency Meter, now abandoned.

Background of the invention

The invention relates to an apparatus for measuring the viscosity or consistency of a liquid or suspension, especially for controlling the consistency of a flowing fibre suspension such as paper pulp.

Consistency meters are generally provided with a rotary sensing member driven by a motor and immersed in the suspension to be controlled, and the consistency may then be calculated either from the speed of rotation of said member (at a constant driving force) or from the power required to rotate the member at a constant speed. In a known apparatus to which the invention especially refers, the spindle of the rotary sensing member is resiliently connected to a surrounding tubular shaft driven at a constant speed, and the angular movement between the spindle and the driving shaft will thus constitute a measure of the consistency of the suspension in which the rotary member is immersed. However, all these known consistency meters suffer from the inconvenience that the sensing member is highly influenced by a varying speed of flow of the suspension to be measured, and for that reason they must be immersed in a nonflowing fluid if a fairly accurate measurement is desired. In several cases this fact involves a limitation or complication, as it is often of great interest to measure the consistency of a suspension supplied through a pipe line to a vat, where the consistency is to be kept at a constant value.

Summary of the invention

The object of the invention is to provide a viscosity or consistency meter which is substantially unaffected by a varying speed of flow when used to control directly a liquid or suspension flowing through a tubular conduit. For that purpose, a tubing shaft connected to driving means to be rotated at a substantially constant speed carries a propeller at one end, and a spindle extending coaxially through said tubular shaft is connected thereto by resilient means permitting a restricted relative rotation between the spindle and said shaft. Outside the propeller end of the shaft the spindle carries a sensing rotary member preferably designed to rotate substantially in a plane perpendicular to the axis of the spindle so as to cause a minimum of agitation in a surrounding liquid. The shaft and spindle are introduced into a lateral extension of the peripheral wall of a tubular conduit for flowing liquid in such a way that their common axis is directed substantially radially to said conduit, while the sensing rotary member is located to rotate in a plane only a little outside the inner periphery of the conduit so as to be substantially unaffected by the flow of liquid through the conduit. Further, means are provided to indicate the resistance of a liquid against the rotation of the sensing member, and said resistance will then be a measure of the viscosity or consistency of the liquid.

By this arrangement the main flow of liquid in the conduit passes out of contact with the sensing member, but as the rotating propeller causes a suction directed axially onto its hub, a minor portion of the flow of liquid is deflected perpendicularly onto the centre of the sensing member to form a stream passing centrally into the later extension. The propeller subjects the incoming central stream to a centrifugal force, and the outflow thus occurs through the annular space formed between the peripheral line of the rotating sensing member and the surrounding wall of said extension. Independently of a varying speed of flow through the conduit the sensing member is thus all the time rotated in a substantially steady or undisturbed fluid flow exclusively determined by the rotation of the propeller, and consequently a change of the braking force acting upon the sensing member will only depend on a varying viscosity or consistency of the flowing liquid. The result is further improved if, in a preferred embodiment, the sensing member is designed to cause a minimum of agitation, so that the shearing resistance caused by the liquid may be measured in a substantially pure state, i.e. without noticeable turbulence.

The resistance against the rotation of the sensing member may be measured by means indicating the relative angular movement between the spindle and the propeller shaft, but preferably means are provided to indicate the torque which tends to turn the spindle in relation to the propeller shaft.

It may be noted that whenever the expression "liquid" is used in the foregoing or in the following description it also means a suspension of any kind, preferably a fibre suspension.

Brief description of the drawings

In the drawings:
FIGURES 3–5 show three different embodiments of rotary sensing members as seen in axial direction from the left in FIG. 1.
FIGURE 7 shows a perspective view of the movement transforming means used in the device in FIG. 6.

Detailed description of preferred embodiments

Figure 1:
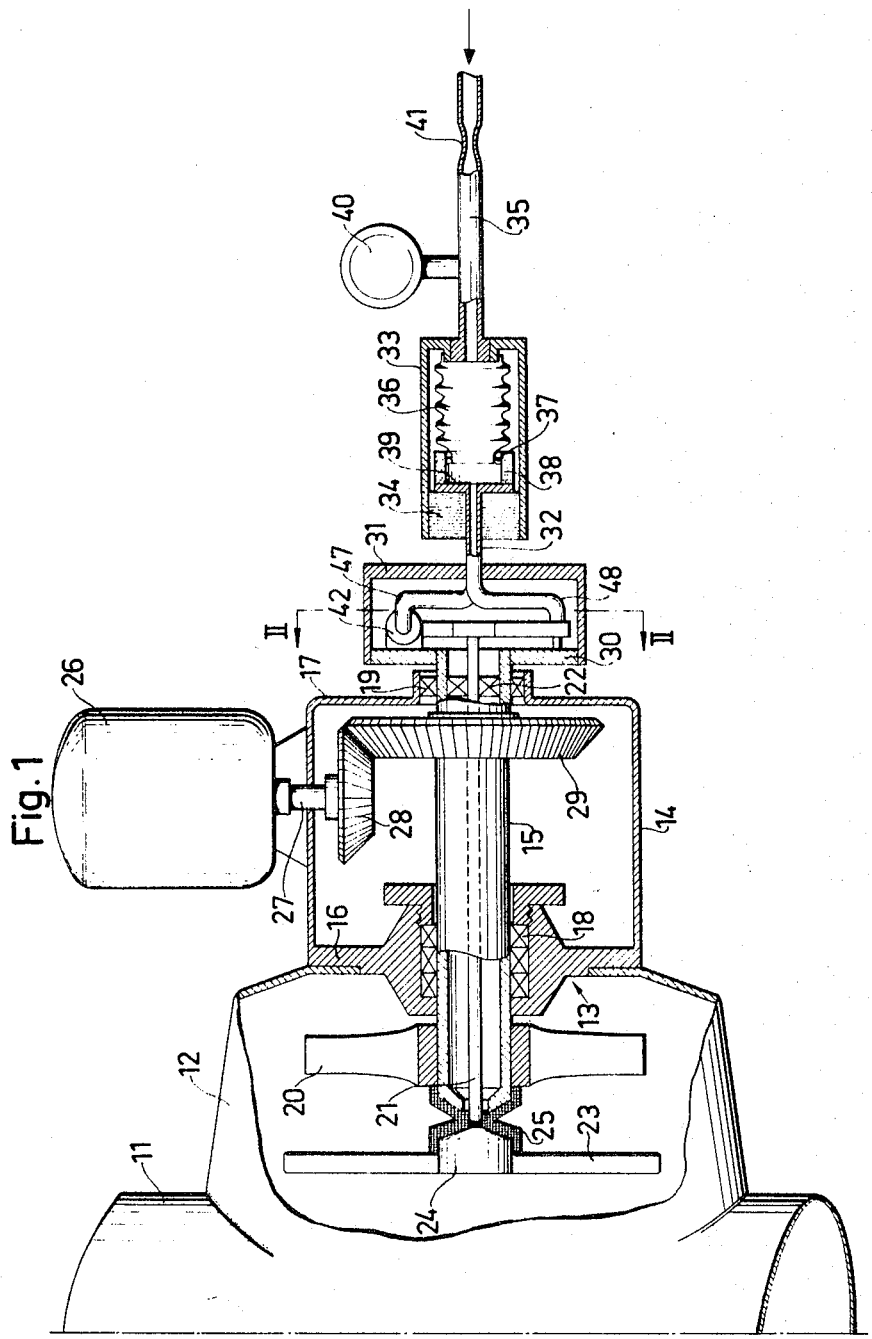
FIGURE 1 shows an axial section of a consistency meter constructed according to the invention and mounted to control the consistency of a fibre suspension flowing through a conduit.

In FIG. 1, a pipe line 11 for supply of pulp or another liquid has a cup-shaped lateral extension 12 provided with a central opening 13, and the housing 14 of the apparatus is mounted to cover this opening 13 in such a way that the rotary members are located in the cup-shaped portion 12 with their axis directed radially to the pipe line 11. The tubular shaft 15 which extends through two opposite end walls 16 and 17 of the housing 14, is journalled in a bushing 18 in the fore wall 16 and in a ball bearing 19 in the rear wall 17. A propeller 20 is secured to the end of the shaft 15 projecting from the bushing 18. A spindle 21 extending coaxially through the tubular shaft 15 is journalled therein by a ball bearing 22 at its rear end. The fore end of the spindle 21 projects from the propeller end of the shaft 15 and carries a rotary sensing member 23 in front of the propeller. The rotary member 23 has a hub portion 24 formed with a conical surface which is connected to a similar conical end surface on the tubular shaft 15 by means of an elastic rubber ring 25 fixed to said surfaces by vulcanization. As seen in FIG. 1, the ring 25 has preferably a V-shaped cross-section, the purpose of which will be described hereinafter. Evidently the mounting is such that the spindle 21 may be turned through a small angle in relation to the surrounding tubular shaft 15. As already mentioned the rotary sensing member 23 is arranged to rotate in a plane a little outside the inner periphery of the cylindrical wall of the pipe 11.

The tubular shaft 15 is adapted to be driven at a constant speed by an electric motor 26 over a reduction gear enclosed in the housing 14. The motor 26 is supported on the top of the housing and its shaft 27 extends downwards into the housing 14 where it carries a bevel gear 28 which meshes with a bevel gear 29 on the tubular shaft 15.

When the tubular shaft 15 is rotated, the spindle 21 and the sensing member 23 will, of course, also rotate owing to the elastic connection ring 25. In dependence on its consistency, however, the suspension causes a resistance against the rotation, and this resistance results in a corresponding braking of the sensing member 23 so that the spindle 21 is subjected to a torque more or less great. This torque which may be regarded as representative for the consistency of the liquid, may be measured by an indicating mechanism described in the following.

Figure 2:
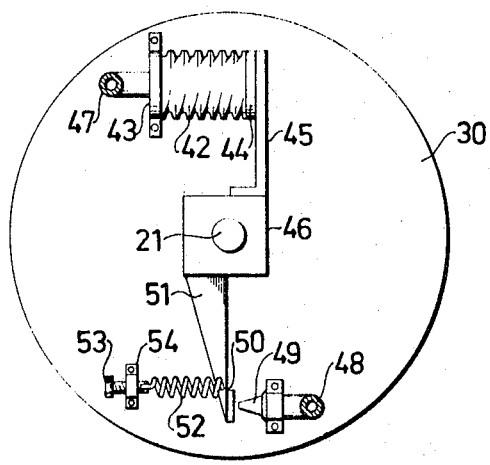
FIGURE 2 shows a cross section through a torque indicating mechanism on the line II—II in FIG. 1.

Outside the housing 14 the end of the tubular shaft 15 has fixed to it an annular disk 30 (see also FIG. 2) which carries a U-shaped stirrup 31 extending diametrically. A pipe 32 is mounted in the stirrup 31 coaxially to the shaft 15, and the projecting end of this pipe 32 is journalled in one end of a stationary sleeve 33 by means of a bearing 34. A conduit 35 for pressurized air is introduced through the opposite end of the sleeve 33 and communicates with a bellows 36 mounted axially within the sleeve. The inner end of the bellows 36 is by means of an O-ring 37 of rubber connected to one end of a cylindrical ring 38 of graphite or compressed powdered carbon, and the free end of the latter ring 38 is by the action of the resilient bellows 36 kept pressed into sealing contact with the surface of an annular disk 39 secured to the end of the pipe 32 inside the bearing 34. The disk 39 is made of a hard anti-friction material, such as Stellite for instance, so that it may rotate in contact with the graphite ring 37 without noticeable friction. In fact, bearing members of this kind have proved especially advantageous due to the good sealing effect and a reduced wear. The conduit 35 is connected to a manometer 40 or another pressure indicating instrument and before the manometer the conduit is provided with a restricted passage 41.

A bellows 42 has one end wall 43 secured to the disk 30 carried by the shaft 15, while its opposite end wall 44 is connected to an arm 45 which extends substantially radially from a hub portion 46 mounted on the projecting end of the spindle 21. The bellows 42 communicates with the pipe 32 by a branch conduit 47 inserted through the stationary end wall 43. Another branch conduit 48 extends from the pipe 32 to a nozzle 49 attached to the disk 30. The mouth of the nozzle 49 is arranged to cooperate with a valve plate 50 at the end of an arm 51 which projects from the hub 46 opposite to the first arm 45. The arrangement is such that the bellows 42 is compressed and the nozzle 49 is throttled when the spindle 21 is turned in anti-clockwise direction. The valve plate arm 51 is actuated in clockwise direction by a spring 52 extending from a set screw 53 which may be adjusted in a fixed ear 54 on the disk 30.

The indicating mechanism described functions as follows. It may be assumed that the motor 26 rotates the shaft 15 in clockwise direction as seen from the right in FIG. 1. Then the resistance against the rotation causes a relative movement of the spindle 21 anti-clockwise, so that the valve plate 50 throttles the nozzle 49. The pressure of air in the bellows 42 is thus increased and strives to turn the spindle 21 clockwise, whereby the plate 50 is moved a little from the nozzle 49. Very soon an equilibrium is reached, and the pressure in the bellows 42 may then be regarded as a measure of resistance against the rotation, i.e., the consistency of the suspension flowing through the pipe 11. This pressure may be read on the manometer 40.

As mentioned above, the insertion of the sensing rotary member 23 together with a propeller 20 in a lateral extension 12 of the pipe 11 results in a more exact measurement, as the resistance against the rotation is not influenced by a varying speed of flow in the conduit 11. The V-shaped cross-section of the elastic rubber ring 25 has also proved to be advantageous. When a torsion ring is turned, its deformation will, of course, increase in relation to the distance from the axis of rotation, but because of the wedge-shaped cross-section of the ring the peripheral ring portions having a greater possibility of absorbing such deformations, whereby the hysteresis effect becomes moderate. Moreover, a substantially uniform deformation of the whole axial section of the ring results in a more accurate measuring, as the angular movement of the shaft will correspond directly to the magnitude of the torque within a range of measurements wide enough for practical purposes.

The sensing member is preferably designed to rotate substantially in a radial plane so as to cause a minimum of turbulence distorting the measured value. FIGS. 3 and 4 show rotary members having such a function.

The rotary member 55 shown in FIG. 3 is especially intended to be used in diluted fibre suspensions, i.e., concentrations from about 2.5% to 0.3% or even lower. The member has two rings 56, 56 extending diametrically from a hub 57 in a common plane perpendicular to the axis of rotation. Each wing 56 has a rounded fore edge 58, from which the cross-section tapers in drop-shape onto the rear edge 59, as indicated by the sectional area 60. It may be noted that the intended direction of rotation is anti-clockwise in the FIGURES 3–5. Preferably the wings 56 are rather wide next to the periphery and become narrower inwardly onto the hub 57. In the embodiment in FIG. 3, the fore edges 58 are tangents to the hub 57. The relation between the width and the thickness of each wing may vary between 3:1 and 5:1, for instance. The fore "cutting" edge 58 must be rather thick to be subjected to a sufficient resistance in diluted suspensions, and the drop-shaped cross-section prevents a turbulent flow behind the rear edge 59. The retraction of the rear edge 59 onto the centre of the hub 57 serves to increase the distance between the cutting edge 58 of each of the wings and the rear edge 59 of the other wing so as to prevent distortion of the measured value.

The sensing member 61 in FIG. 4 is intended for thicker fibre suspensions, i.e., concentrations over 2.5%. Also here two wings 62, 62 extend diametrically from a hub 63 in a common radial plane. Each wing 62 consists of a pointed blade with a uniform thickness. The fore edge 64 is convex and bent rearwards, seen in the direction of rotation, while the rear edge 65 may be somewhat concave.

The sensing member 66 shown in FIG. 5 is intended to be used in fibre suspensions, where the fibres are inclined to be spun into coherent threads. The member consists of a toothed disk 67 with a central hub 68. The teeth 69 are of an even number and are set in the same way as the teeth of a saw blade. Each tooth 69 has a sloping fore edge 70 and a steep rear edge 71. The teeth 69 serve to cut any threads formed by spinning of the fibres when the member 66 rotates in the suspension.

Figure 6:
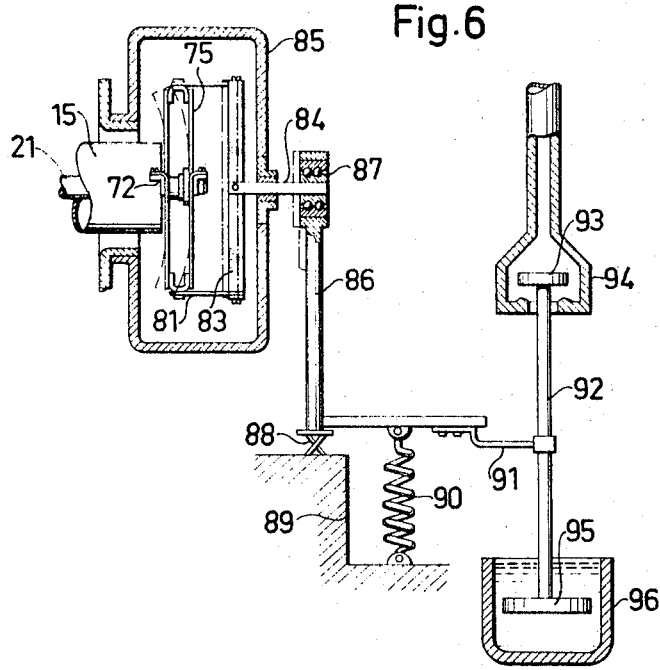
FIGURE 6 shows an axial section through a device for measuring the angular movement between the spindle and the propeller shaft.

FIGS. 6 and 7 show a mechanism useful to measure a relative angular movement between the tubular shaft 15 and the spindle 21, and described in my pending U.S. application No. 561,969 filed June 30, 1966. Two angular brackets 72 are welded externally to the rear end of the tubular shaft 15 opposite to each other. The spindle 21 projects slightly beyond the tubular shaft 15 and its outer end has fixed to its a double-armed lever 73 directed diametrically. The lever 73 has angular end portions 74 each disposed opposite to one of the brackets 72. Each lever end 74 is connected to an adjacent bracket 72 by means of a U-shaped or hairpin-shaped spring 75, the legs of which have angularly bent end portions 76, 76′ secured to the bracket 72 to the lever end 74, respectively, by means of screws. Each U-spring 75 may be composed of two parallel leaf springs 78, 78′ stiffened at both ends by short leaf springs 79 and connected at their outer ends by a rigid U-shaped member 80. The U-shaped springs 75 are dimensioned exactly equal and are directed substantially tangentially in relation to the shaft 15 with their central portions 80 facing in the same peripheral direction. In an initial position, the side surfaces of the leaf springs 78, 78′ are located in radial planes. The central portions 80 of the springs 75 are connected to leaf springs 81 directed axially outwards and preferably stiffened at both ends by means of short leaf springs 82. The outer ends of the springs 81 are interconnected by a transverse rod 83 which carries a shaft or pin 84 coaxial to the spindle 21. As appears from FIG. 6, the shaft 84 is guided in a bearing in a casing 85 mounted around the spring assembly. Outside the casing 85, the shaft 84 is connected to one end of a bell crank 86 by means of a spherical ball bearing 87. The bell crank 86 is mounted to swing in the plane of FIG. 6 in that its apex is connected to a cross spring 88 carried by a stationary support 89. The other arm of the crank 86 is actuated by a tension spring 90 anchored in the same support 89. By means of a leaf spring 91 said arm is further connected to a valve spindle 92 of a valve member 93 which throttles an air inlet port of a valve housing 94. If desired, the opposite end of the valve spindle 92 may be connected to a disk 95 submerged in liquid in a vessel 96, whereby a damping of the movement is obtained.

When the propeller shaft 15 is driven clockwise, and the spindle 21 is turned through a small angle anti-clockwise in relation to said shaft 15, the lever 73 actuates the two U-springs 75 such that they are bent in parallel to the shaft 15 towards the opposite shaft end, as indicated by broken lines in FIG. 7. Because the central portions and the end portions of the U-springs 75 are stiffened, mainly the middle portions of the legs are bent, whereby the greatest possible deflection is obtained. The bending of the U-springs 75 causes the connecting rod 83 to move in parallel to itself, and the shaft 84 is then moved axially inwards. The relative angular movement between the shaft 15 and the spindle 21 has thus been transformed into a linear movement. In the embodiment shown, said movement of the shaft 84 causes the bell crank 87 to swing anti-clockwise so that the valve member 93 is opened a little more. In the known way, a conduit 97 from the valve housing 94 may be connected to a regulator which controls the consistency of the suspension flowing through the pipe 11 by opening and throttling a valve (not shown) for supply of diluting liquid.

What I claim is:

1. An apparatus for measuring the viscosity or consistency of a liquid or suspension flowing through a tubular conduit, comprising a tubular shaft connected to driving means to be rotated at a substantially constant speed and carrying a propeller at one end, a spindle extending coaxially through said tubular shaft and connected thereto by resilient means permitting a restricted relative rotation between the spindle and the shaft, a sensing rotary member secured to the end of the spindle outside the propeller end of said tubular shaft and preferably designed to rotate substantially in a plane perpendicular to the axis of the spindle so as to cause a minimum of agitation in a surrounding liquid, said shaft and spindle being introduced into a lateral extension of the peripheral wall of said conduit in such a way that their common axis is directed substantially radially to the conduit, while the sensing rotary member is located to rotate in a plane only a little outside the inner periphery of the conduit, whereby said sensing member will be substantially unaffected by the flow of liquid through the conduit, and means provided to indicate the resistance of the liquid against the rotation of the sensing member, said resistance being a measure of the viscosity or consistency of the liquid.

2. An apparatus as claimed in claim 1, in which the resilient means connecting the tubular shaft to the spindle consists of a rubber ring substantially V-shaped in cross-section and secured to corresponding conical surfaces on the shaft and the spindle, respectively.

3. An apparatus as claimed in claim 1, in which the sensing rotary member includes two blade-like wings extending diametrically from a hub portion and located in a common plane perpendicular to the axis of said hub portion.

4. An apparatus as claimed in claim 3, in which the cross-section of each wing tapers rearwards from a fore edge, as seen in the intended direction of rotation.

5. An apparatus as claimed in claim 4, in which said fore edge of each wing forms a tangent to the periphery of the hub portion.

6. An apparatus as claimed in claim 1, in which the sensing rotary member comprises a toothed disk provided with set teeth, each of said teeth having a sloping fore edge and a steep rear edge, as seen in the intended direction of rotation.

References Cited

UNITED STATES PATENTS

| 2,992,651 | 7/1961 | Krofta | 73—59 X |
| 3,181,349 | 5/1965 | Jansson | 73—59 |

FOREIGN PATENTS

| 769,684 | 3/1957 | Great Britain. |
| 1,045,467 | 10/1966 | Great Britain. |

LOUIS R. PRINCE, Primary Examiner

JOSEPH W. ROSKOS, Assistant Examiner

U.S. Cl. X.R.

73—63